(12) United States Patent
Yoon (10) Patent No.: US 11,210,409 B2
(45) Date of Patent: Dec. 28, 2021

(54) METHOD FOR DUPLEXING DATABASE

(71) Applicant: Silcroad Soft, Inc., Gyeonggi-do (KR)

(72) Inventor: Jeong Il Yoon, Gyeonggi-do (KR)

(73) Assignee: SILCROAD SOFT, INC.

( * ) Notice: Subject to any disclaimer, the term of this patent is extended or adjusted under 35 U.S.C. 154(b) by 237 days.

(21) Appl. No.: 16/464,255

(22) PCT Filed: Nov. 9, 2017

(86) PCT No.: PCT/KR2017/012683
§ 371 (c)(1),
(2) Date: May 24, 2019

(87) PCT Pub. No.: WO2018/097521
PCT Pub. Date: May 31, 2018

(65) Prior Publication Data
US 2019/0272381 A1 Sep. 5, 2019

(30) Foreign Application Priority Data
Nov. 25, 2016 (KR) .......................... 10-2016-0158427

(51) Int. Cl.
*G06F 21/60* (2013.01)
*G06F 16/27* (2019.01)
(Continued)

(52) U.S. Cl.
CPC ............ *G06F 21/602* (2013.01); *G06F 11/14* (2013.01); *G06F 11/1446* (2013.01);
(Continued)

(58) Field of Classification Search
CPC ........ G06F 21/602; G06F 21/60; G06F 21/62; G06F 11/14; G06F 16/27; G06F 11/1446;
(Continued)

(56) References Cited

U.S. PATENT DOCUMENTS

| | | |
|---|---|---|
| 5,504,818 A | 4/1996 | Okano |
| 5,530,855 A | 6/1996 | Satoh et al. |

(Continued)

FOREIGN PATENT DOCUMENTS

| | | | |
|---|---|---|---|
| JP | 6-195250 A | 7/1994 | |
| JP | 2887299 B2 | 2/1999 | |

(Continued)

*Primary Examiner* — Meng Li
(74) *Attorney, Agent, or Firm* — Fish IP Law, LLP (57) ABSTRACT

The present invention contemplates steps for a change data capture (CDC) between a first database and a second database when executed by one or more processors of the computer system. The disclosed method contemplates extracting a data in a redo log of a first database by a first management module, the data comprising an encrypted column data included in an encrypted column and a non-encrypted column data included in a non-encrypted column, identifying whether the data extracted is the encrypted column data included in the encrypted column, and determining whether to change the encrypted data included in the encrypted column to a null data and to transmit the encrypted data, when the extracted data is the encrypted column data.

6 Claims, 6 Drawing Sheets

(51) Int. Cl.
  *G06F 11/14*  (2006.01)
  *G06F 21/62*  (2013.01)
  *H04L 29/06*  (2006.01)

(52) U.S. Cl.
  CPC .............. *G06F 16/27* (2019.01); *G06F 21/60* (2013.01); *G06F 21/62* (2013.01); *G06F 21/6218* (2013.01); *H04L 63/0435* (2013.01)

(58) Field of Classification Search
  CPC ............. G06F 21/6218; G06F 2201/80; G06F 11/2097; G06F 11/2094; G06F 21/6254; H04L 63/0435; H04L 63/0464
  See application file for complete search history.

(56) References Cited

U.S. PATENT DOCUMENTS

| | | | |
|---|---|---|---|
| 10,372,926 B1* | 8/2019 | Leshinsky | H04L 9/0894 |
| 2002/0065956 A1* | 5/2002 | Yagawa | G06F 21/6227 |
| | | | 719/330 |
| 2004/0255133 A1* | 12/2004 | Lei | G06F 21/6227 |
| | | | 713/193 |
| 2006/0026156 A1* | 2/2006 | Zuleba | G06F 21/6227 |
| 2011/0295803 A1 | 12/2011 | Hideshima et al. | |
| 2016/0246988 A1 | 8/2016 | Kwon et al. | |

FOREIGN PATENT DOCUMENTS

| | | |
|---|---|---|
| JP | 2887299 B2 * | 4/1999 |
| JP | 2011-248678 A | 12/2011 |
| KR | 10-2005-0064278 A | 6/2005 |
| KR | 10-2015-038897 A | 3/2006 |
| KR | 10-2009-0067342 A | 6/2009 |

* cited by examiner

METHOD FOR DUPLEXING DATABASE

CROSS-REFERENCE TO RELATED APPLICATIONS

This application claims priority to and the benefit of Korean Patent Application No. 10-2016-0158427 filed in the Korean Intellectual Property Office on Nov. 25, 2016, the entire contents of which are incorporated herein by reference.

TECHNICAL FIELD

The present invention relates to database management, and more particularly, to an improved method of replicating and storing data in a database.

BACKGROUND ART

A database means a set of data integrated and managed so as to be shared and used by multiple persons. The database may be used in banks, online shopping malls, in-house management systems, and the like.

Current database systems allow storing and retrieving a large amount of information. Some of the information may include, for example, sensitive information such as a credit card number, etc. In particular, the security of a database for collecting and managing personal information in financial institutions, Internet portal sites, and the like is required to prevent an unauthorized user from determining or improperly recording information processed by a computer, to protect an information processing service of an authorized user from being denied by a computer system, and to guarantee integrity, confidentiality, and availability of the data in a database management system that holds a large amount of data.

Various solutions are being studied in order to prevent loss of data. In particular, considering a recent environment in which many industrial fields including banking, shopping, bookings, and the like are performing services on the Internet, database backup and replication processes are very important to prevent a fatal blow such as data loss or service interruption due to the nature of an Internet site. The backup prepares and saves a copy of the data that is being worked on, so as to prepare for the loss or deletion of data due to user's mistake, computer error, virus infection, etc., whereas the replication which is to store the same data in multiple servers simultaneously in order to increase reliability and availability as described above is a concept of immediately restoring the service by inputting another server even though a failure occurs in a main server.

In a solution for preventing the loss of the data by replicating the database, when the data is backed up to another database, there is a risk that the sensitive information will be lost. Thus, there is a demand in the art for solutions that replicate the databases while maintaining the confidentiality of confidential information.

Korean Patent Unexamined Publication No. 10-2005-0064278 discloses a database replication device.

Accordingly, there is a need for a CDC technology which is capable of decreasing a delay for data synchronization between a source database and a target database and does not cause a problem for data synchronization even when a table structure is changed.

SUMMARY OF THE INVENTION

The present disclosure has been made in an effort to replicate a database including security data.

An exemplary embodiment of the present disclosure provides a non-transitory computer readable medium including a computer program including encoded commands. The computer program causes one or more processors of a computer system to perform steps for a change data capture (CDC) between a first database and a second database when executed by one or more processors of the computer system and the steps may include: extracting data in a redo log of a first database by a first management module, the data including an encrypted column data included in an encrypted column and a non-encrypted column data included in a non-encrypted column; identifying, by a first management module, whether the data extracted is the encrypted column data included in the encrypted column; and determining, by the first management module, to change the encrypted data included in the encrypted column to null data and to transmit the encrypted data, when the extracted data is the encrypted column data.

Alternatively, the encrypted column data may be the data encrypted with a first database unique key when the data is stored in a first storage medium.

Alternatively, the steps may further include: receiving, by a first transceiver module, a request for the encrypted column data transmitted from the second database; in response to the request, generating, by the first management module, decrypted encrypted column data by querying the encrypted column data from a table of the first database; generating, by a first security module, re-encrypted encrypted column data by encrypting the decrypted encrypted column data with a first security module key, so that a second security module of the second database decrypts with a second security module key; and determining to transmit the re-encrypted encrypted column data to the second database.

Alternatively, the second security module key and the first security module key may be symmetric keys.

Another exemplary embodiment of the present disclosure provides a non-transitory computer readable medium including a computer program including encoded commands. The computer program causes one or more processors of a computer system to perform steps for a change data capture (CDC) between a first database and a second database when executed by one or more processors of the computer system and the steps may include: receiving data transmitted from a first database by a second transceiver module, the data including data contained in a non-encrypted column of a table and null data contained in an encrypted column; generating, by the second management module, change data, by reproducing transactions performed in the first database with respect to the data transmitted from the first database and performing a processing on a transaction before commit; and determining, by the second management module, to request encrypted column data corresponding to the null data to the first database.

Alternatively, the generating of the change data may include generating the change data by reproducing the transaction performed in the first database with respect to the data transmitted from the first database by modifying the encrypted column into the null data.

Alternatively, the steps may further include recording the changed data in a table of a second database by the second management module, wherein the change data includes a value of data included in a non-encrypted column and the null data.

Alternatively, the steps may further include: receiving, by the second transceiver module, encrypted column data re-encrypted with a first security module key of the first database transmitted from the first database; generating, by the second security module, the decrypted encrypted column data by decrypting the re-encrypted encrypted column data with a second security module key; and updating, by the second management module, the decrypted encrypted column data in a table of a second database.

Alternatively, the updating, by the second management module, the decrypted encrypted column data in a table of a second database may include recording the decrypted encrypted column data into a second storage medium of the second database by modifying the data in the encrypted column of the table of the second database, in which the null data is recorded into the decrypted encrypted column data.

Yet another exemplary embodiment of the present disclosure provides a database for change data capture between a first database and a second database. The database may include: a first storage medium in which data of an encrypted column of a table is encrypted and recorded; a first management module querying the data of an encrypted column of the table, determining the data of an encrypted column of a table is to be encrypted and recorded, extracting data in a redo log of a first database, the data including an encrypted column data included in an encrypted column and a non-encrypted column data included in a non-encrypted column, identifying whether the data extracted is the encrypted column data included in the encrypted column and determining to change the encrypted data included in the encrypted column to null data and to transmit the encrypted data, when the extracted data is the encrypted column data; and a first security module generating re-encrypted encrypted column data by encrypting decrypted encrypted column data with a first security module key.

Still yet another exemplary embodiment of the present disclosure provides a database for change data capture between a first database and a second database. The database may include: a second transceiver module receiving data transmitted from a first database, the data including data contained in a non-encrypted column of a table and null data contained in an encrypted column; a second storage medium in which data of an encrypted column of a table is encrypted and recorded; a second management module decrypting and reading the data of an encrypted column of the table, determining to encrypt and to record the data of an encrypted column, generating change data, by reproducing transactions performed in the first database with respect to the data transmitted from the first database and performing a processing on a transaction before commit, and determining to request encrypted column data corresponding to the null data to the first database; and a second security module for decrypting the re-encrypted encrypted column data.

Still yet another exemplary embodiment of the present disclosure provides a method for changed data capture between a first database and a second database. The method may include: extracting data in a redo log of a first database by a first management module, the data including encrypted column data included in an encrypted column and a non-encrypted column data included in a non-encrypted column; identifying, by a first management module, whether the data extracted is the encrypted column data included in the encrypted column; and determining, by the first management module, to change the encrypted data included in the encrypted column to null data and to transmit the encrypted data, when the extracted data is the encrypted column data.

Still yet another exemplary embodiment of the present disclosure provides a method for change data capture between a first database and a second database. The method includes: receiving data transmitted from a first database by a second transceiver module, the data including data contained in a non-encrypted column of a table and null data contained in an encrypted column; generating by the second management module change data, by reproducing transactions performed in the first database with respect to the data transmitted from the first database and performing a processing on a transaction before commit; and determining by the second management module, to request encrypted column data corresponding to the null data to the first database.

According to an exemplary embodiment of the present disclosure, a database including security data can be replicated.

DETAILED DESCRIPTION

Various exemplary embodiments will now be described with reference to drawings and like reference numerals are used to refer to like elements throughout all drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication through local and/or remote processing according to a signal (for example, data from one component that interacts with other components and/or data from other systems through a network such as the Internet through a signal in a local system and a distribution system) having one or more data packets, for example.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

Figure 1A:
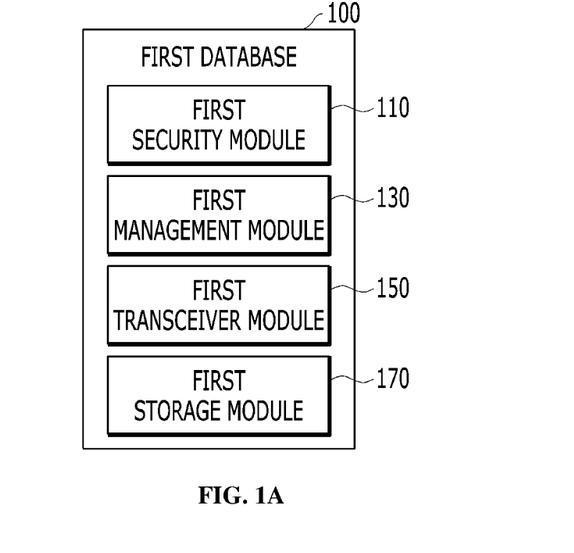
FIG. 1 is a block diagram of a database according to an exemplary embodiment of the present disclosure.
Figure 1B:
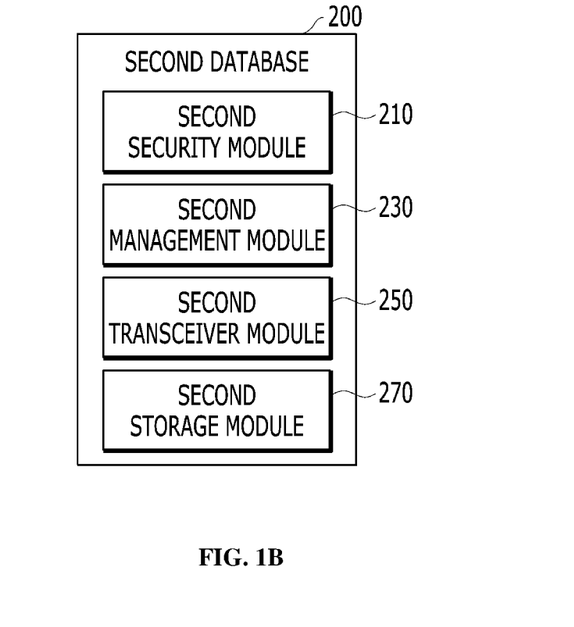

FIG. 1 is a block diagram of a database according to an exemplary embodiment of the present disclosure.

In an exemplary embodiment of the present disclosure, a first database 100 and a second database 200 may include security modules 110 and 210, management modules 130 and 230, transceiver modules 150 and 250, storage media 170 and 270, respectively. The first database 100 may include a database server. The second database 200 may also similarly include the database server.

The first transceiver module 150 communicates with the second transceiver module 250 of the second database to transmit/receive data. The first transceiver module 150 may transmit/receive a table 300, data of the table, a redo log, null data, non-encrypted column data 310, re-encrypted encrypted column data 335, etc., with the second database 200. Further, the first transceiver module 150 may receive a request for the data 300 included in the encrypted column from the second database 200.

The first transceiver module 150 and the second transceiver module 250 may include a wired/wireless Internet module for network access. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, a digital subscriber line (XDSL), fibers to the home (FTTH), power line communication (PLC), or the like may be used.

The first and second storage media 170 and 270 may store the table 300. In the table 300, some columns may be encrypted (330) in order to protect sensitive information. The encrypted column 330 stored in the storage media 170 and 270 may be decrypted and queried in the management modules 130 and 230. Some columns including the sensitive information are encrypted and stored in the tables stored in the storage media 170 and 270, so that even when the storage media 170 and 270 themselves are stolen, security for sensitive data may be maintained. Since it is inefficient to encrypt the entire table, only some columns may be encrypted and stored in the storage media 170 and 270.

The first and second storage media 170 and 270 include a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but are not limited thereto. The first and second storage media 170 and 270 may include predetermined storage media for non-transitorily and persistently storing data in the database.

The management modules 130 and 230 may perform operations for Change Data Capture (CDC). The management modules 130 and 230 may perform normal operations of a database management system and may be separate modules separated from the database management system.

The database management system may encrypt data with a key thereof when recording data to the storage media 170 and 270 in order to maintain the security of the sensitive data and the management modules 130 and 230 may query encrypted data through a database management system (not illustrated).

Figure 2:
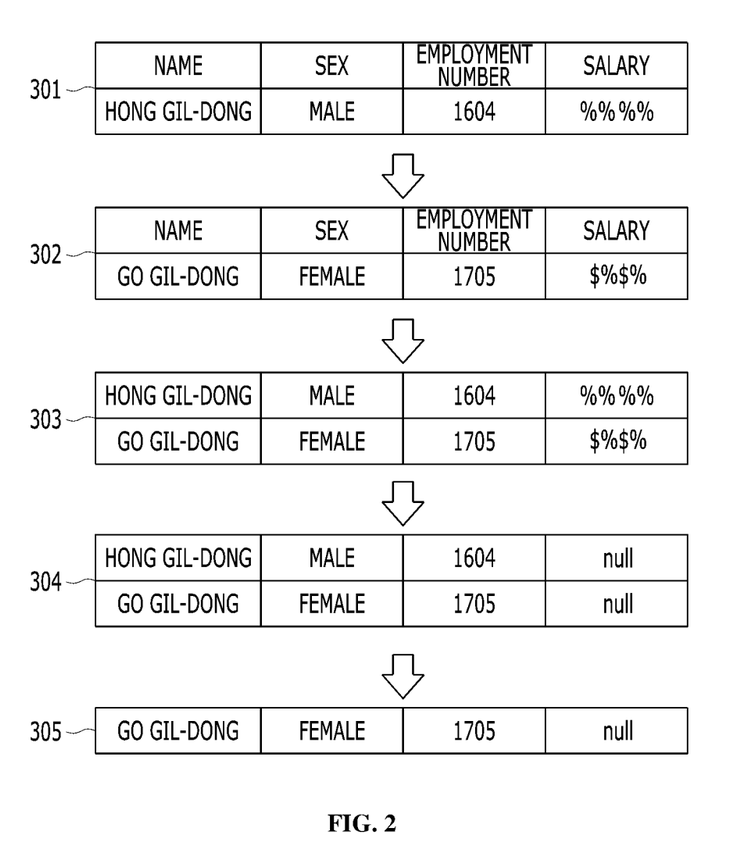
FIG. 2 is a conceptual view illustrating processing of data extracted in a redo log according to an exemplary embodiment of the present disclosure.

As illustrated in FIG. 2, it is assumed that a table including a name (column 1), a sex (column 2), an employment number (column 3), and an annual salary (column 4, encrypted column) exists. It is assumed that a value of each column is inserted into (Hong Gil-dong, M, 1604, 30 million won) (301) and updated to (Go Gil-dong, F, 1705, 40 million won) (302). The first management module 130 may extract, from the redo log, data (in the example of FIG. 2, (Hong Gil-dong, M, 1604, %%%% (encrypted 30 million won) and (Go Gil-dong, F, 1705, $%$% (encrypted 40 million won))) (303). The first management module 130 may identify that column 4 is the encrypted column data. In this case, the first management module 130 may determine to security-process the encrypted column data and transfer the encrypted column data to the second database 200. Since column 4 is the encrypted column data, the first management module 130 may change the data of column 4 to the null data (in the example of FIG. 2, null) (304). When the data 304 extracted from the redo log is received by the second database, the second management module 230 of the second database 200 reproduces the transaction performed in the first database 100 and performs processing for the transaction before commit to generate change data 305. Here, the data extracted from the redo log, which is received by the second database 200 may include data of the non-encrypted column and data of the encrypted column processed as the null data by the first management module 130. Here, the change data may include non-encrypted column data for the data of the non-encrypted column and may be in a state in which a data value is null for the encrypted column.

In this case, for the data of the encrypted column, the change data may be generated in a state (for example, null) in which the data of the encrypted column is a value replaced by the first security module 110. Further, the second management module 230 of the second database 200 may determine to request the encrypted column data (the data of column 4 in the example of FIG. 2) corresponding to the null data.

The first management module 130 may attempt to access the encrypted column data with a right for the encrypted column data in response to a request for the encrypted column data from the second database 200. Here, when the table of the first database 100 is changed, the first management module 130 may obtain the encrypted column data through a flashback query in column 4, for example, in the example of FIG. 2. In response to the request, the first management module 130 may generate the decrypted encrypted column data 333 by querying the encrypted column data 331 in the table 311 of the first database. The first security module 110 may generate the re-encrypted encrypted column data 335 by encrypting the decrypted encrypted column data 333 with the first security module key so as for the second security module 210 of the second database to decrypt the decrypted encrypted column data 333 with a second security module key. The first security module key and the second security module key may be symmetric keys, and the first security module 110 and the second security module 210 may exchange the symmetric keys in advance through a predetermined key exchange algorithm.

The second security module 210 decrypts re-encrypted encrypted column data 335 with the second security module key to generate the decrypted encrypted column data 333. The second management module 230 may cause the decrypted encrypted column data 333 to be updated to the table 300 of the database. The second management module 230 may modify the encrypted column data of the table of the second database to which a null value is recorded in the decrypted encrypted column data to be encrypted and recorded in the second storage medium 270 of the second database. In this case, the second database 200 may encrypt the decrypted encrypted column data with the unique key of the second database, the unique key of the second database as the unique key of the second database may be different from the unique key of the first database, and the value encrypted with the unique key of the second database may be different from the value encrypted with the unique key of the first database.

According to an exemplary embodiment of the present disclosure, since the data of the encrypted column is re-encrypted by the security module and transferred from the first database to the second database, it is possible to solve the security problem that the data of the encrypted column is exposed onto the network in a decrypted state.

Figure 3:
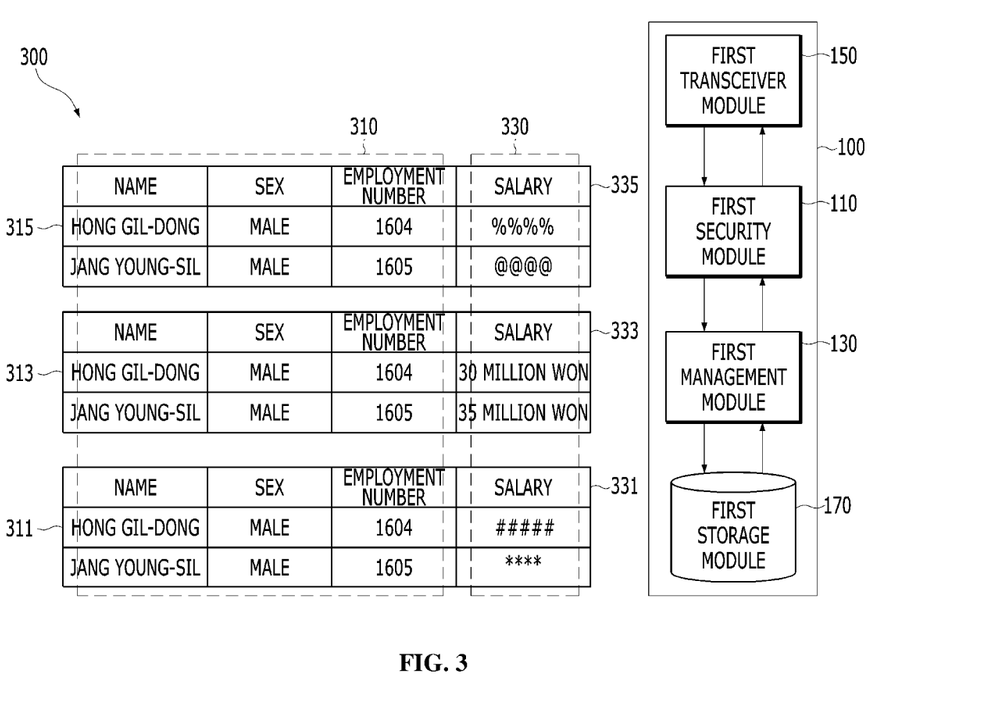
FIG. 3 is a schematic view illustrating encryption and decryption of a data table in a first database according to an exemplary embodiment of the present disclosure.

As illustrated in FIG. 3, the data included in the table 300 may be queried through the first management module 130 and the database management system (not illustrated) in the first storage medium 170. The data included in the table 300 may include the encrypted column 330 and the non-encrypted column 330. A table of reference numeral 311 illustrated in FIG. 3 which represents a table in which some columns are encrypted and stored on the first storage medium 170 may include the encrypted column 330 and the non-encrypted column 310. A table of reference numeral 313 illustrated in FIG. 3 as a table queried by the first management module 130 represents a table indicating a state in which the encrypted column 330 is decrypted and a table of reference numeral 315 is a table indicating a state in which the encrypted column 330 is re-encrypted by the first security module 110. Encrypting all data of the table is high in security but low in efficiency and may degrade performance of the database, and as a result, the database management system (not illustrated) may encrypt only some columns and store the encrypted columns in the storage media 170 and 270. The encrypted column 330 as a column including the sensitive data may be encrypted and recorded in the first storage medium 170 in order to maintain the security. The non-encrypted column 330 as a column including data with a somewhat lower need for the security may be recorded in the first storage medium 170 while not being encrypted. When reading the data recorded in the first storage medium 170, the database management system (not illustrated) may decrypt the data of the encrypted column 330 and use the decrypted data in the case of a transaction having a legitimate right to access the encrypted column 330. The first management module 130 may query the encrypted column 330. The data of the encrypted column of the first database may be encrypted with a unique key of the first database and stored in the first storage medium 170 and the data of the encrypted column in the redo log of the first database may be encrypted with the unique key of the first database. The unique key of the first database may be different from the unique key of the second database. Therefore, when the redo log itself is transmitted to the second database 200, a problem may occur in which the encrypted column may not be decrypted in the second database 200. Therefore, the first management module 130 needs to transfer to the second database 200 an access right to the encrypted column of the table of the first database 100 by securing data decrypted by the first management module 130, but a security problem may occur when the decrypted data is transferred to the second database 200 through a common network. Accordingly, according to an exemplary embodiment of the present disclosure, the first security module 110 re-encrypts the data of the encrypted column decrypted by the legitimate access right and transfers the re-encrypted data of the encrypted column to the second database 200, thereby preventing a security problem in which the data of the decrypted encrypted column is exposed onto the network.

The first management module 130 may determine to capture change data of the first database 100 and transfer the captured change data to the second database 200. To this end, the first management module 130 may extract data from the redo log of the first database 100. The first management module 130 may identify whether the extracted data is the encrypted column data included in the encrypted column 330. When the extracted data is the encrypted column data, the first management module 130 may determine to change the encrypted column data to null data and transfer the null data to the second database 200. The null data is a state there is no data and an empty state and the first management module 130 may change the encrypted column data to null data and transfer the null data to the second database 200. The first security module 110 encrypts decrypted encrypted column data 333 with a first security module key to generate re-encrypted encrypted column data 335.

Figure 4:
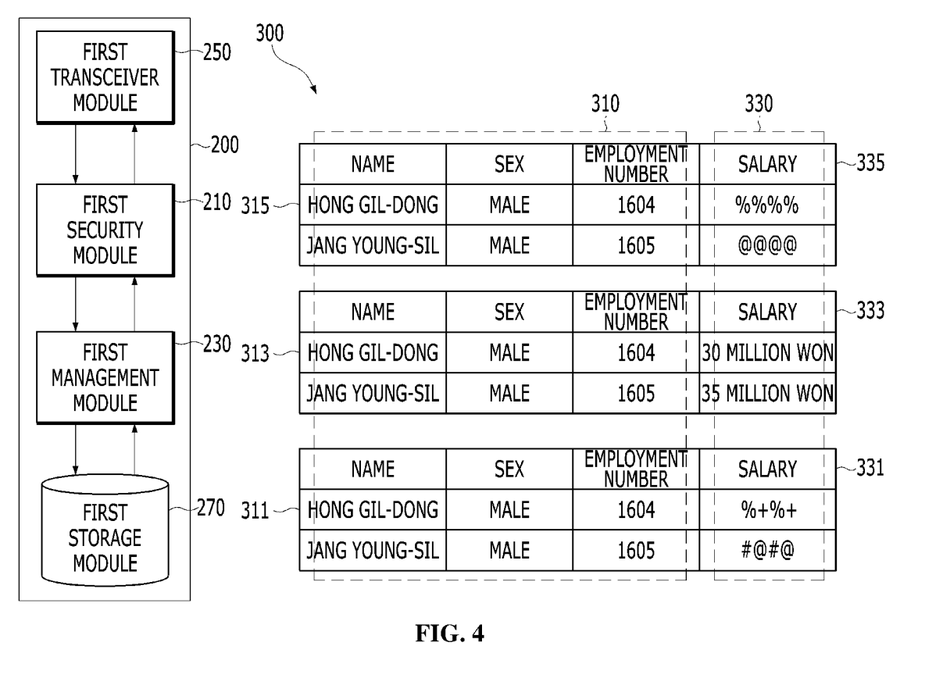
FIG. 4 is a schematic view illustrating encryption and decryption of a data table in a second database according to an exemplary embodiment of the present disclosure.

FIG. 4 is a schematic view illustrating encryption and decryption of a data table in a second database according to an exemplary embodiment of the present disclosure.

Figure 5:
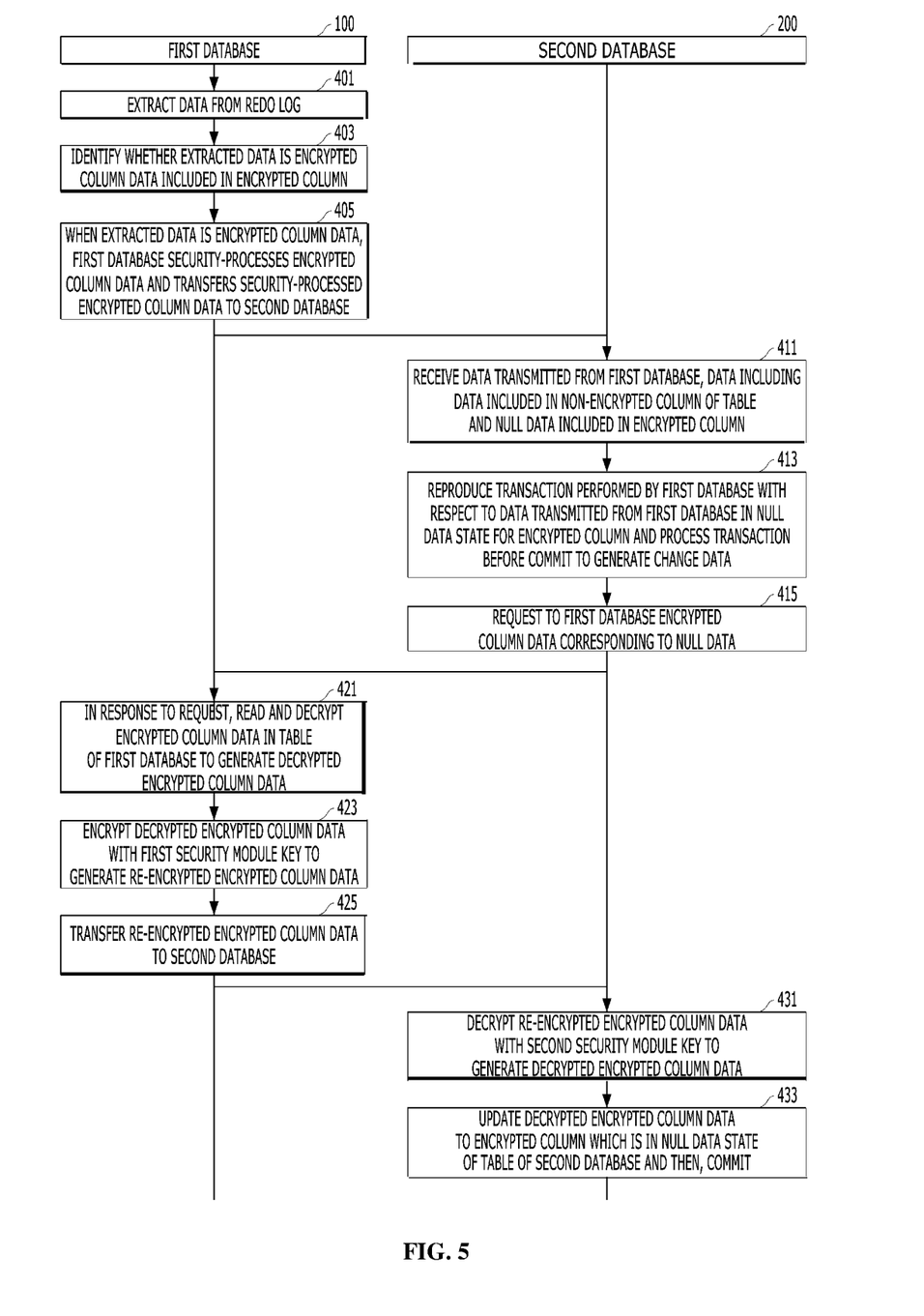
FIG. 5 is a flowchart illustrating a method for replication of a database, which is performed in first and second databases according to an exemplary embodiment of the present disclosure.

FIG. 5 is a flowchart illustrating a method for replication of a database, which is performed in first and second databases according to an exemplary embodiment of the present disclosure.

The first database 100 may extract data from the redo log (401). The data may include encrypted column data included in an encrypted column of a table and non-encrypted column data included in a non-encrypted column. In the example illustrated in FIG. 2, in a table including a name (column 1), sex (column 2), employee number (column 3), and salary (column 4, encrypted column), when each column is inserted into (Hong Gil-dong, M, 1604, 30 million won) (301) and updated to (Go Gil-dong, F, 1705, 40 million won) (302), the first database 100 may extract (Hong Gil-dong, M, 1604, %%%% (encrypted 30 million won) and (Go Gil-dong, F, 1705, $%$% (encrypted 40 million won)) (303), for example. The aforementioned data is just an example and the present disclosure is not limited thereto.

The first database 100 may identify whether the extracted data is the encrypted column data included in the encrypted column (403).

When the extracted data is the encrypted column data, the first database 100 may security-process the encrypted column data and transfer the corresponding encrypted column data to the second database 200 (405). The first database 100 may security-process the encrypted column data among the extracted data (304) and transfer the corresponding encrypted column data to the second database 200. The security-processing may include an operation of changing the encrypted column data to null data. The null data (the null value of column 4 in reference numeral 304 in the example of FIG. 2) may prevent the encrypted column data from being exposed.

The second database 200 may receive data transmitted from the first database 100 (411). The data transmitted from the first database 100 may include data included in the non-encrypted column 330 of the table 300 and null data included in the encrypted column. The data may include data of columns 1 to 4 of reference numeral 304 in the example of FIG. 2 and the description of FIG. 2 is just an example and does not limit the present disclosure.

The second database 200 reproduces a transaction performed in the first database 100 with respect to the data transmitted from the first database in a null data state with respect to the encrypted column and processes the transaction before commit to generate the change data 305 (413). Since the encrypted column in the change data 305 includes only the null data, the second database 200 may reflect the null data to the encrypted column.

The second database 200 may request to the first database 100 the encrypted column data corresponding to the null data (415). Since an actual value is not recorded in the second database 200 as a value (for example, the value of the salary column in the example of FIG. 2) of the encrypted column data in the current state, the second database 200 may request the actual value to the first database.

In response to the request, the first database 100 may read and decrypt the encrypted column data in the table of the first database to generate the decrypted encrypted column data 333 (421). The first database 100 may cause the first management module 130 having the legitimate access right to generate the decrypted encrypted column data 333 by accessing the encrypted column data in response to the request of the second database.

The first database 100 may encrypt the decrypted encrypted column data with the first security module key to generate the re-encrypted encrypted column data (423). When the decrypted encrypted column data is transmitted through the network, there is a risk that the sensitive information may be exposed to the network in the decrypted state. Therefore, the first database 100 may re-encrypt the decrypted encrypted column data with the first security module key.

The first database 100 may transfer the re-encrypted encrypted column data to the second database 200 (425).

The second database 200 decrypts the re-encrypted encrypted column data received from the first database 100 with the second security module key to generate the decrypted encrypted column data (431). The second security module key may be a symmetric key to the first security module key, and the first database 100 and the second database 200 may exchange the symmetric keys in advance through a predetermined key exchange algorithm.

The second database 200 may update the decrypted encrypted column data to the encrypted column which is in the null data state of the table of the second database and then, commit the updated decrypted encrypted column data (433). The null data may be, for example, a dummy value such as null or a state in which the data is empty. Referring to FIG. 2, the transaction of the second database 200 may be constituted by an insert (Hong Gil-dong, M, 1604, null), an update (Go Gil-dong, F, 1705, null), and an update of (Go Gil-dong, F, 1705, 40 million won). The disclosure of FIG. 2 is just an example and the present disclosure is not limited thereto.

Since the first database 100 and the second database 200 have the unique keys, encryption keys of the first and second databases may be different. Therefore, when the encrypted data extracted from the redo log of the first database is transmitted to the second database as it is, the encrypted data in the second database 200 may not be decrypted. Therefore, a module having an access right to the encrypted column of the first database 100 needs to secure the decrypted data and transfer the secured decrypted data to the second database 200, but the security problem may occur when the decrypted data is transferred to the second database 200 through the common network. Accordingly, according to an exemplary embodiment of the present disclosure, the first security module 110 re-encrypts the data of the encrypted column decrypted by the legitimate access right and transfers the re-encrypted data of the encrypted column to the second database 200, thereby preventing the security problem in which the data of the decrypted encrypted column is exposed onto the network.

Figure 6:
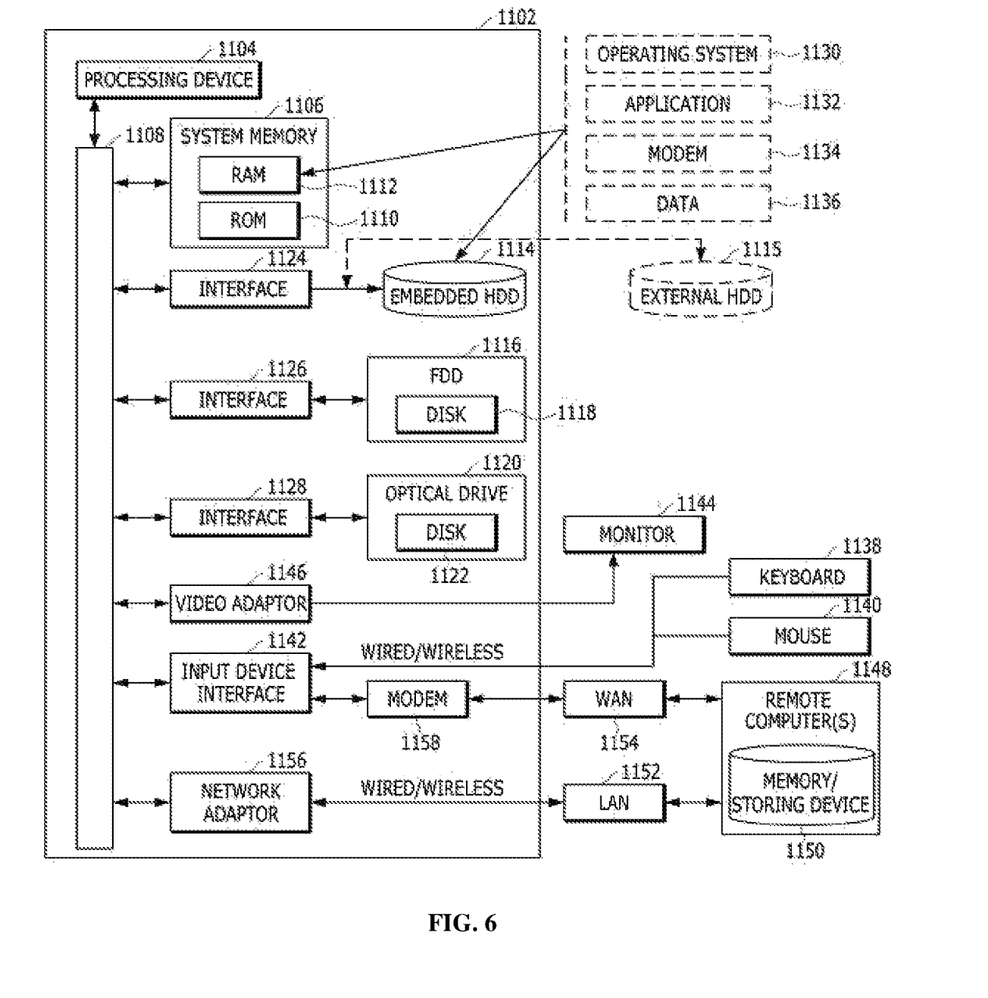
FIG. 6 is a block diagram of an exemplary computing device for implementing a change data capture (CDC) solution according to an exemplary embodiment of the present disclosure.

FIG. 6 is a block diagram of an exemplary computing device for implementing a change data capture (CDC) solution according to an exemplary embodiment of the present disclosure.

The present disclosure has generally been described above in association with features which may be executed on computers or processors in one or more servers, but it will be well appreciated by those skilled in the art that the present disclosure can be implemented in a combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include computer storage media. The computer storage media include volatile and non-volatile, temporary or non-temporary, and movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

Transceiving (communication) media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, transmitting/receiving (communication) media include wired media such as a wired network or a direct-wired connection and wireless media such as acoustic, RF, infrared and other wireless media.

In FIG. 6, an exemplary environment 600 that implements various aspects of the present disclosure including a computing device 602 for implementing CDC features of the present disclosure is shown and the computing device 602 includes a processing device 604, a system memory 606, and a system bus 608. The system bus 608 connects system components including the system memory 606 (not limited thereto) to the processing device 604. The processing device 604 may be a predetermined processor among various commercial processors. A dual processor and other multi-processor architectures may also be used as the processing device 604.

The system bus 608 may be any one of several types of bus structures which may be additionally interconnected to a local bus using any one of a memory bus, a peripheral device bus, and various commercial bus architectures. The system memory 606 includes a read only memory (ROM) 610 and a random access memory (RAM) 612. A basic input/output system (BIOS) is stored in the non-volatile memories 610 including the ROM, the EPROM, the EEPROM, and the like and the BIOS includes a basic routine that assists in transmitting information among components in the computing device 602 at a time such as in-starting. The RAM 612 may also include a high-speed RAM including a static RAM for caching data, and the like.

The computing device 602 also includes an internal hard disk drive (HDD) 614 (for example, EIDE and SATA)—the internal hard disk drive (HDD) 614 may also be configured for an external purpose in an appropriate chassis (not illustrated)—, a magnetic floppy disk drive (FDD) 616 (for example, for reading from or recording in a mobile diskette 618), and an optical disk drive 620 (for example, for reading a CD-ROM disk 622 or reading from or recording in other high-capacity optical media such as the DVD). The hard disk drive 614, the magnetic disk drive 616, and the optical disk drive 620 may be connected to the system bus 608 by a hard disk drive interface 624, a magnetic disk drive interface 626, and an optical drive interface 628, respectively. An interface 624 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computing device 602, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 630, one or more application programs 632, other program module 634, and program data 636 may be stored in the drive and the RAM 612. All or some of the operating system, the application, the module, and/or the data may also be cached by the RAM 612. It will be well appreciated that the present disclosure may be implemented in operating systems which are commercially usable or a combination of the operating systems.

A user may input commands and information in the computing device 602 through one or more wired/wireless input devices, for example, pointing devices such as a keyboard 638 and a mouse 640. Other input devices (not illustrated) may include a microphone, an IR remote controller, a joystick, a game pad, a stylus pen, a touch screen, and others. These and other input devices are often connected to the processing device 604 through an input device interface 642 connected to the system bus 608, but may be connected by other interfaces including a parallel port, an IEEE 1394 serial port, a game port, a USB port, an IR interface, and others.

A monitor 644 or other types of display devices are also connected to the system bus 608 through interfaces such as a video adapter 646, and the like. In addition to the monitor 644, the computer generally includes a speaker, a printer, and other peripheral output devices (not illustrated).

The computing device 602 may operate in a networked environment by using a logical connection to one or more remote computers including remote computer(s) 648 through wired and/or wireless communication. The remote computer(s) 648 may be a workstation, a server computer, a router, a personal computer, a portable computer, a microprocessor based entertainment apparatus, a peer device, or other general network nodes and generally includes multiple components or all of the components described with respect to the computing device 602, but only a memory storage device 650 is illustrated for brief description. The illustrated logical connection includes a wired/wireless connection to a local area network (LAN) 652 and/or a larger network, for example, a wide area network (WAN) 654. The LAN and WAN networking environments are general environments in offices and companies and facilitate an enterprise-wide computer network such as Intranet, and all of them may be connected to a worldwide computer network, for example, the Internet.

When the computing device 602 is used in the LAN networking environment, the computing device 602 is connected to a local network 652 through a wired and/or wireless communication network interface or an adapter 656. The adapter 656 may facilitate the wired or wireless communication to the LAN 652 and the LAN 652 also includes a wireless access point installed therein in order to communicate with the wireless adapter 656. When the computing device 602 is used in the WAN networking environment, the computing device 602 may include a modem 658 or is connected to a communication server on the WAN 654, or has other means that configure communication through the WAN 654 such as the Internet, etc. The modem 658 which may be an internal or external and wired or wireless device is connected to the system bus 608 through the serial port interface 642. In the networked environment, the program modules described with respect to the computing device 602 or some thereof may be stored in the remote memory/storage device 650. It will be well known that an illustrated network connection is exemplary and other means configuring a communication link among computers may be used.

The computing device 602 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such a device, for example, a cellular phone which enables the computer to transmit and receive data indoors or outdoors, that is, anywhere in a communication range of a base station. The Wi-Fi network uses a wireless technology called IEEE 802.6 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 6 Mbps (802.6a) or 54 Mbps (802.6b) in unlicensed 2.4 and 5 GHz wireless bands or operate in a product including both bands (dual bands).

An exemplary embodiment of the present disclosure may be implemented even in the form of a recording medium including a command executable by a computer such as a program module executed by the computer. A computer readable medium may be a predetermined available medium accessible by the computer or includes all of volatile and non-volatile media and removable and irremovable media. Further, the computer readable medium may include both a computer storage medium and a communication medium. The computer storage medium includes all of the volatile and non-volatile and removable and irremovable media implemented by a predetermined method or technology for storing information such as a computer readable command, a data structure, a program module, or other data. The communication medium typically includes the computer readable command, the data structure, the program module, or other data of a modulated data signal such as a carrier, or other transmission mechanisms and includes a predetermined information transfer medium.

The aforementioned description of the present disclosure is used for exemplification, and it can be understood by those skilled in the art that the present disclosure can be easily modified in other detailed forms without changing the technical spirit or requisite features of the present disclosure. Therefore, it should be appreciated that the aforementioned embodiments are illustrative in all aspects and are not restricted. For example, respective constituent elements described as single types can be distributed and implemented, and similarly, constituent elements described to be distributed can also be implemented in a coupled form.

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" include a wireless channel and various other media that can store, possess, and/or transfer instruction(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

What is claimed is:

1. A method for causing a computer to perform steps for a change data capture between a first database and a second database using one or more computer processors, comprising:
   determining, by a first management module, to change encrypted column data included in an encrypted column among data of the first database to a null data and to transmit the null data to the second database;
   receiving, by a first transceiver module, a request for the encrypted column data transmitted from the second database;

in response to the request, generating, by the first management module, a decrypted column data by querying the encrypted column data from a table of the first database;

generating, by a first security module, a re-encrypted column data by encrypting the decrypted column data with a first security module key, so that a second security module of the second database decrypts with a second security module key; and determining to transmit the re-encrypted column data to the second database.

2. The method of claim 1, wherein the encrypted column data comprises a data encrypted with a first database unique key stored in a first storage medium.

3. The method of claim 1, further comprising:

extracting a data in a redo log of the first database by the first management module, the data including the encrypted column data included in the encrypted column and a non-encrypted column data included in a non-encrypted column; and identifying, by the first management module, the encrypted column including the encrypted column data among one or more columns included in the data.

4. The method of claim 1, wherein the second security module key and the first security module key are symmetric keys.

5. A database system for change data capture between a first database and a second database, the database system including one or more processors and memories comprising:

a first storage medium in which data of an encrypted column of a table is encrypted and recorded;

a first management module querying the data of an encrypted column of the table, allowing the data of an encrypted column of a table is to be encrypted and recorded determining by the first management module, to change encrypted column data included in the encrypted column among data of the first database to a null data and to transmit the null data to the second database, generating a decrypted column data by querying the encrypted column data from a table of the first database, and determining to transmit a re-encrypted column data to the second database;

a first transceiver module receiving a request for the encrypted column data transmitted from the second database; and a first security module generating the re-encrypted column data by encrypting decrypted column data with a first security module key, so that a second security module of the second database decrypts with a second security module key.

6. A method for change data capture between a first database and a second database using one or more computer processors, comprising:

determining, by a first management module, to change encrypted column data included in an encrypted column among data of the first database to a null data and to transmit the null data to the second database;

receiving, by a first transceiver module, a request for the encrypted column data transmitted from the second database;

in response to the request, generating, by the first management module, a decrypted column data by querying the encrypted column data from a table of the first database;

generating, by a first security module, a re-encrypted column data by encrypting the decrypted column data with a first security module key, so that a second security module of the second database decrypts with a second security module key; and determining to transmit the re-encrypted column data to the second database.

* * * * *